United States Patent
Fulmer

[11] Patent Number: 5,556,130
[45] Date of Patent: Sep. 17, 1996

[54] SINGLE SIDE WALL AIR BAG INFLATOR

[75] Inventor: Brian H. Fulmer, Farr West, Utah

[73] Assignee: Morton International, Inc., Chicago, Ill.

[21] Appl. No.: 318,237

[22] Filed: Oct. 5, 1994

[51] Int. Cl.⁶ ................................................ B60R 21/28
[52] U.S. Cl. ............................................ 280/741; 102/530
[58] Field of Search .................................. 280/736, 741, 280/742; 102/530, 531

[56] References Cited

U.S. PATENT DOCUMENTS

| | | | |
|---|---|---|---|
| 3,985,076 | 10/1976 | Schneiter et al. | 280/741 |
| 4,249,673 | 2/1981 | Katoh et al. | 102/530 |
| 4,530,516 | 7/1985 | Adams et al. | 280/741 |
| 4,711,466 | 12/1987 | Breed | 280/741 |
| 4,722,551 | 2/1988 | Adams | 280/736 |
| 4,846,368 | 6/1989 | Goetz | 280/736 |
| 4,923,212 | 5/1990 | Cuevas | 280/736 |
| 5,000,479 | 3/1991 | Werner et al. | 280/741 |
| 5,241,910 | 9/1993 | Cunningham et al. | 280/741 |
| 5,382,415 | 1/1995 | Kishimoto et al. | 280/741 |

*Primary Examiner*—Paul N. Dickson
*Attorney, Agent, or Firm*—Philip C. Peterson; Gerald K. White

[57] ABSTRACT

A new and improved single side wall air bag inflator includes a housing containing an ignition device, a quantity of pyrotechnic gas generant material and a filter. The housing includes a cup-shaped base member having an annular bottom wall with a central opening for access to the ignition device and an integrally formed, upstanding ported side wall extends upwardly of the bottom wall. The side wall has a radially inwardly deformable, free upper end portion forming a retaining flange for securing a top wall in place spaced above the bottom wall and closing off an upper end portion of the housing. The top wall has a depressed outer peripheral edge portion facing and sealed with the downwardly and radially inwardly deformed upper end flange of the single side wall.

2 Claims, 1 Drawing Sheet

SINGLE SIDE WALL AIR BAG INFLATOR

BACKGROUND OF THE INVENTION

1. Field of the Invention

The present invention relates to a new and improved single side wall air bag inflator and more particularly to a unique single side wall housing for containing an ignition system, pyrotechnic gas generating material and a filter.

2. Background of the Prior Art

In the past, air bag inflator housings have included an outer side wall and at least one or more inner side walls in coaxial alignment therewith for containing an ignition system and a gas generant material separated from an outer filter compartment. The internal walls as well as the outer side wall were provided with ports for the passage of gas from the central ignition chamber into the gas generating chamber and then into the filter chamber for discharge through diffuser ports outwardly to inflate an associated air bag. The ports provided in the internal ignition chamber and gas generant chamber walls were constrictive in nature and the ports in these walls were necessarily substantially less in total cross-sectional flow area than the walls themselves resulting in a high velocity flow through these ports and inefficiency caused thereby. In addition, the high velocity gas flow into a filter sometimes caused areas of burn out and holes to develop therein which greatly reduced the effectiveness of the filter in entrapping contaminants and cooling the hot gases before reaching the exterior of the housing to inflate the associated air bag.

OBJECTS OF THE INVENTION

It is an object of the present invention to provide a new and improved single side wall air bag inflator and more particularly a new and improved air bag inflator having a housing with no internal side walls separating the housing into distinct compartments.

Another object of the present invention is to provide a new and improved single side wall housing for an air bag inflator which is extremely efficient in operation and greatly simplified in construction and fabrication.

Yet another object of the present invention is to provide a new and improved air bag inflator of the character described which can be formed substantially out of low cost stamped sheet metal parts or forgings in a minimum number so that assembly is rapid and economical.

Still another object of the present invention is to provide a new and improved air bag inflator of the character described wherein a cup-shaped lower member having an upwardly extending outer side wall is deformed at the upper free end of the side wall to provide an in-turned radial flange for holding a circular top wall in place to close off the housing and seal the gas generating material therein.

Still another object of the present invention is to provide a new and improved single side wall housing for an air bag inflator which eliminates the requirement or need for an internal ignition chamber wall and for an internal combustion chamber wall.

Yet another object of the present invention is to provide a new and improved single side wall housing having a central ignition opening in a bottom wall thereof and a high energy ignition device seated to close off the opening and secured in place at the center of the housing.

Yet another object of the present invention is to provide a new and improved single side wall housing for an air bag inflator wherein a high energy ignition device closes off an ignition opening in a bottom wall of the housing and is sealed and positively secured to close the opening by means of a unique sealing flange formed on the bottom wall around the ignition opening therein.

Still another object of the present invention is to provide a new and improved single side wall housing for an air bag inflator wherein an outer annular filter serves as an inner support for a top wall of the housing when an upper end portion of the outer side wall is deformed radially inwardly to positively close and seal the upper end of the housing.

Another object of the present invention is to provide a new and improved single side wall air bag inflator housing which requires a minimum number of parts and which requires a minimum number of operational steps during the fabrication and assembly thereof so that a low cost, extremely reliable air bag inflator is provided.

BRIEF SUMMARY OF THE PRESENT INVENTION

The foregoing and other objects and advantages of the present invention are accomplished in a new and improved single side wall air bag inflator having a metal housing containing an electrically activated ignition device, a quantity of pyrotechnic gas generating material and a filter. The inflator includes a cup-shaped base member of formed sheet metal or a forging having an annular bottom wall with a central opening for providing access to the ignition device. The cup-shaped base includes an integrally formed, upwardly extending, ported outer side wall having a radially deformable free upper end portion. A top wall is spaced above the bottom wall for closing off the free upper end portion of the side wall and the top wall protectively contains the quantity of gas generating material surrounding and outwardly of the central, high energy ignition device which is held in place to close the ignition opening on the bottom wall by means of an integral, upwardly extending cylindrical wall deflectable downwardly and inwardly around the edge of the ignition opening in the bottom wall. An annular filter is provided outwardly of the gas generant material just inside the ported outer side wall of the cup-shaped base. When the internal components have been assembled inside the base, the top wall is placed in position and the upper end portion of the ported side wall is deformed radially inwardly in order to seal and close off the upper end of the housing. A pair of sealing rings are provided at upper and lower ends of the filter to prevent blow by and the filter itself serves as a support for the top wall when the upper end portion of the integral outer side wall is deformed downwardly and radially inwardly to complete the assembly of the air bag inflator.

BRIEF DESCRIPTION OF THE DRAWINGS

For a better understanding of the present invention, reference should be had to the following detailed description taken in conjunction with the drawings, in which.

DETAILED DESCRIPTION OF A PREFERRED EMBODIMENT OF THE INVENTION

Figure 1:
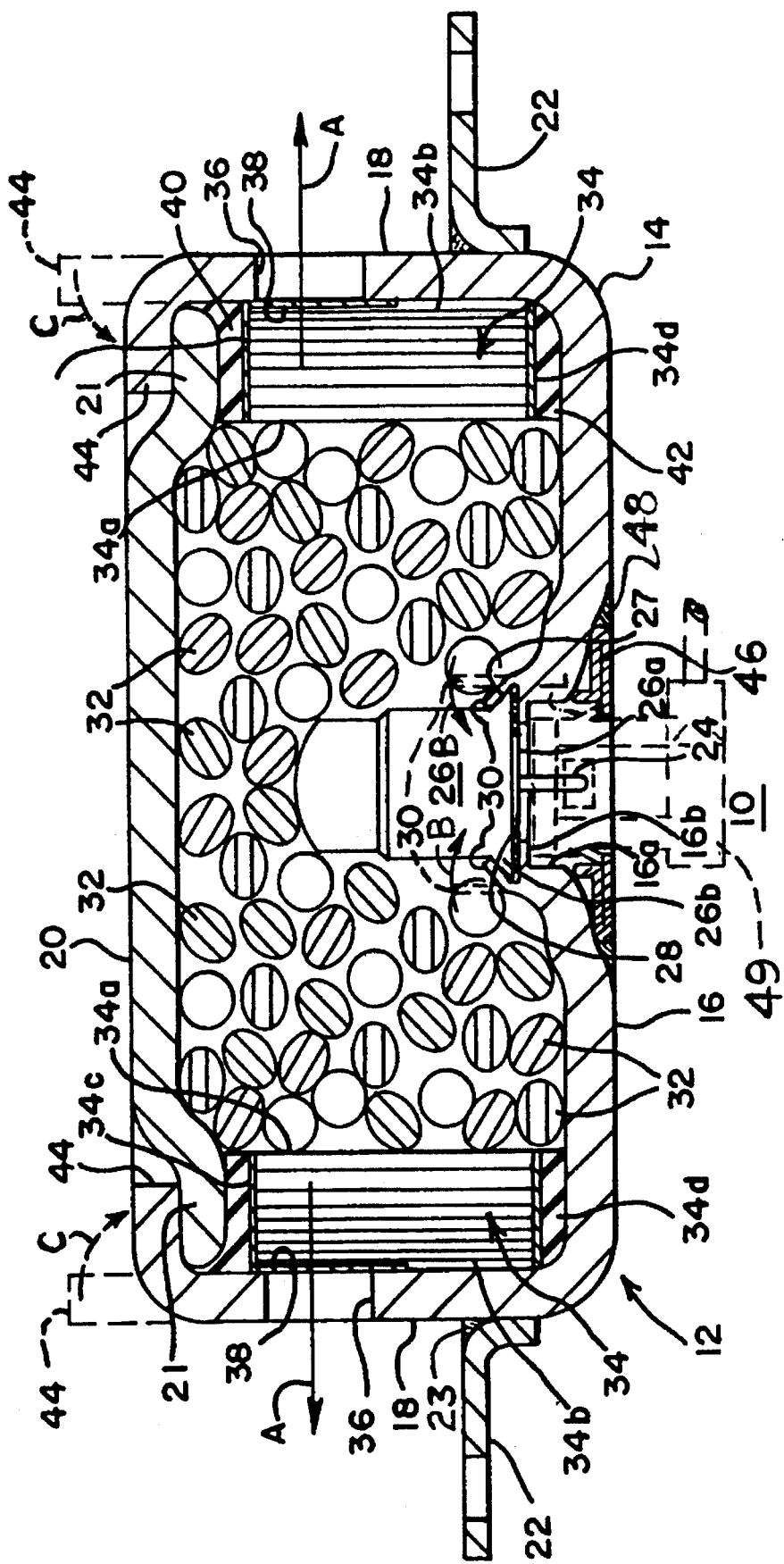
FIG. 1 is a diametrically transverse cross-sectional view of a new and improved single side wall air bag inflator constructed in accordance with the features of the present invention.

Referring now more particularly to the drawings, in FIG. 1 is illustrated a new and improved single side wall air bag inflator constructed in accordance with the features of the present invention and referred to generally by the reference numeral 10. The inflator 10 includes a generally cylindrical housing 12 formed of stamped or cold formed sheet metal components or a forging including a cup-shaped base 14 having an annular bottom wall 16 with an integrally formed, upstanding outer side wall 18 projecting upwardly thereof. An upper end portion of the housing 12 is closed by means of a generally circular top wall 20 also formed of stamped sheet metal and having an outer diameter slightly less than the inside diameter of the upstanding cylindrical side wall 18 of the cup-shaped base member 14. The inflator housing 12 is provided with a radially outwardly extending mounting flange 22 at a lower level joined to the side wall 18 by appropriate means such as a press fit and/or welding 23 or the like. The flange 22 provides a convenient means for supporting and attaching the inflator 10 to the hub of a steering wheel of an automobile or other motor vehicle (not shown).

In accordance with the present invention the generally circular-shaped annular bottom wall 16 is formed with a central ignition opening 16a so that access may be had to electrical ignition terminals 24 of a high energy ignition device 26 mounted at the center in the housing 12. At the upper end of the opening 16a there is provided a radially inwardly directed support flange or lip 16b on which is supported a downwardly facing lower end surface 26a of the generally cylindrical ignition device 26 as illustrated. The high energy ignition device 26 has a radially outwardly projecting flange 26b at the lower end with a radially inwardly and upwardly sloping upper surface 27 of frusto-conical shape. A sealing gasket 28 of elastomeric material having a washer-like body disposed between the lower end face 26a of the ignition device 26 and the upper surface of the annular lip 16b of the bottom wall 16 is provided to seal and close off the ignition opening 16a in the bottom wall. An upwardly extending (dotted lines) thin cylindrical wall portion 30 which is an integral part of the cup-shaped base 14, is deformed downwardly and radially inwardly (arrows "B") to overlie the surface 27 on the body of the ignition device 26. When the flange portion 30 is deformed downwardly and inwardly as shown in solid lines, the end flange 26b of the ignition device 26 is secured in place closing off the opening 16a in the bottom wall 16 yet permitting access to the electrical terminals 24 for electrical activation of the ignition device. The seal gasket 28 is compressed between the bottom edge 26a of the ignition device 26 and the inwardly extending flange 16b of bottom wall 16 creating an environmental seal against the entry of outside contaminants.

The electrical terminals 24 of the ignition device 26 are adapted to be electrically energized from an external control system provided in the vehicle in which the inflator 10 is mounted. For this purpose, the inflator 10 includes a clip 46 mounted on the underside of bottom wall 16 of the base member 14 in the opening 16a and secured in place by welding 48 or other fastening means. The clip 46 is formed with a central opening for receiving a snap-in-place, connector 49 (dotted lines) of the vehicle control system having a body with deflectable legs L which engage the clip 46 at the edge of the central opening when the connector body is pushed into place to make electrical connection to the terminals 24 of the ignition device 26.

The ignition device 26 is surrounded radially outwardly and covered upwardly by an annular mass or quantity of gas generating solids 32 packed in the housing 12 in random orientation as shown. These solids 32 may be sodium azide or other types of gas generant material designed to rapidly provide a quantity of high pressure inflation gas when combustion takes place when the ignition device 26 is electrically activated to inflate an associated air bag.

Radially outwardly of the annular mass or quantity of gas generating solids 32, the inflator 10 is provided with an annular filter 34 designed to entrap hot slag and other particulates from the rapidly generated and outwardly flowing high temperature gas. The filter 34 also functions to absorb heat and cool the gas before the gas exits the housing 12 via a plurality of circumferentially spaced apart, diffuser wall ports 36 formed in the single outer side wall 18 of the cup-shaped base member 14.

The filter 34 is generally annular in shape overall and may comprise a plurality of convolutions of metal screen having mesh sizes generally decreasing in opening size or flow passage area from an inside surface 34a adjacent the outer surface of the quantity or mass of gas generating solids 32. Because there are no internal walls in the inflator housing 12, substantially the entire inside surface area 34a of the annular filter 34 is available to receive the rapidly generated gas so that the gas flow is well diffused and the gas velocity is reduced to a value substantially lower than the gas velocity customarily seen in ported wall type structures wherein an internal combustion chamber wall is in place between the gas generant material and the filter. As the rapidly expanding hot gas moves radially outward towards the diffuser ports 36 in the single outer wall 18 to flow outwardly into an associated air bag (not shown) as indicated by the radial arrows "A", the gas flow encounters successive convolutions of the filter element 34 made of screen material generally having smaller size openings in order to better absorb heat from the gas and to entrap smaller size particulates and contaminants. The structure of the filter 34 is provided with an outermost ring or outer side filter surface 34b which lies closely adjacent to an inside surface of the ported side wall 18. Other types of filters may be used such as porous ceramic unitary filters, etc. A thin layer or band of metal foil 38 is adhesively secured on the inside surface of the single outer side wall 18 to seal off the diffuser ports 36 against the entry of outside contaminants into the filter 34 or other interior components within the sealed housing 12.

When gas is generated upon activation of the ignition device 26, the gas generated solids 32 begin to burn and hot products of combustion flow rapidly outwardly in a radially oriented direction through the multi-layer filter 34 and rupture the thin sealing band or foil tape 38 to pass rapidly outwardly as indicated by the arrows "A" for rapidly inflating an associated air bag.

The annular filter 34 also includes opposite, annular, upper and lower end surfaces 34c and 34d and an upper sealing ring 40 is of resilient sealing material capable of withstanding relatively high temperatures is positioned between the upper end 34c and an underside of the top wall 20 around an outer edge portion. Similarly, a lower, sealing ring 42 formed of high temperature resistance, resilient sealing material is positioned between a lower end 34d of the filter 34 and an upper inside surface of the bottom wall 16 adjacent an outer edge portion thereof. The sealing rings 40 and 42 prevent blow by of the filter 34 as the generated gas moves outwardly toward the diffuser wall ports 36. In addition, the upper sealing ring 40 provides a positive, hermetic seal between the inside surface of the upwardly extending side wall 18 and the underside of the top wall 20. Annular, unitary, drop-in type, filters of porous ceramic material and other high temperature resistant materials may also be used.

In accordance with the present invention, an outer peripheral edge portion 21 of the top wall 20 is deformed downwardly below the level of a central portion of an upper end face thereof. An upper end portion 44 (shown in dotted lines) of the side wall 18 is deformed downwardly and radially inwardly (arrows "C") to secure the top wall 20 in place and seal off the upper end of the housing 12 with an overall, generally smooth, planar upper surface. The depressed portion 21 adds strength and stiffness to the top wall 20. During the downward radially inward deformation (arrows "C") of the upper end portion 44 of the side wall 18, the end faces 34c and 34d of the filter 34 provide sufficient stiffening and backing to support the top wall 20 during the cold forming process.

It will thus be seen that the new and improved air bag inflator 10 constructed in accordance with the features of the present invention employs only a single side wall 18 for the entire housing 12 and internal ignition chamber side walls and/or combustion chamber side walls are eliminated, thus reducing cost and assembly time. Moreover, the inefficiency of constricting the gas flow through a ring of relatively small size ports in the internal walls is eliminated and the entire inside surface 34a of the annular filter 34 is available to receive and diffuse the gases resulting in a much lower velocity of flow for better removal of slag particles and other contaminants therefrom before the gas flows out through the diffuser ports 36 to inflate an associated air bag. The high energy ignition device 26 is secured and sealed in place with the sealing gasket 28 and the deformation of the flange element 30 surrounding an upper portion of the central opening 26a in the bottom wall 16.

It will also be seen that the air bag inflator 10 is simple in construction and operation and may be formed and rapidly assembled in an automatic process with conventional cold forming machines which are presently available both to initially form the components out of stamped sheet metal and to subsequently deform the ignition device holding flange 30 and the upper side wall end flange 44.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An air bag inflator including a single side wall housing for containing ignition means, pyrotechnic gas generating means and filter means, comprising:

a cup-shaped base having an annular bottom wall with a central opening for access to said ignition means and an integrally formed, ported, side wall extending upwardly of said bottom wall and having a radially inwardly directed upper end flange;

a top wall spaced above said bottom wall closing off said upper end of said side wall for protectively containing said gas generating means and said filter means and having an outer peripheral edge portion facing and sealed with said upper end flange to close said housing;

ignition means comprising a high energy electrically activated ignition train having a body formed with an outer face closing said central opening of said annular bottom wall;

annular seal means for sealing between said ignition train body and said bottom wall around said central opening;

said ignition means including electrical terminal means projecting from said outer face adapted for interconnection with an external connector having a body with one or more deflectable legs; and clip means on said bottom wall having an opening for receiving said connector body and an edge portion of said opening adapted to be engaged by a deflectable leg of said body for holding said connector in interconnected relation with said terminal means.

2. The air bag inflator of claim 1, wherein:

said clip means is formed of metal and is secured to said bottom wall by welding.

\* \* \* \* \*